Feb. 15, 1927.
G. O. RESHAW
1,617,963
FRUIT PACKING DEVICE
Filed Jan. 29, 1925
2 Sheets-Sheet 1
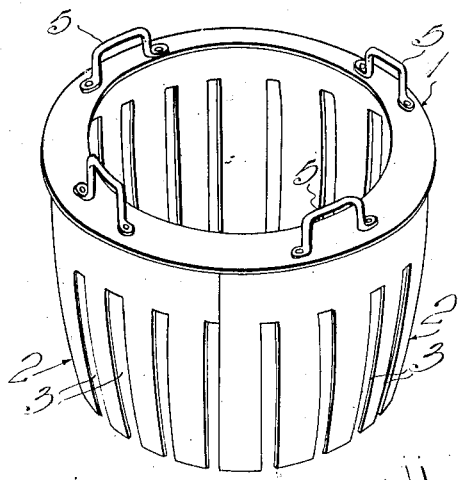
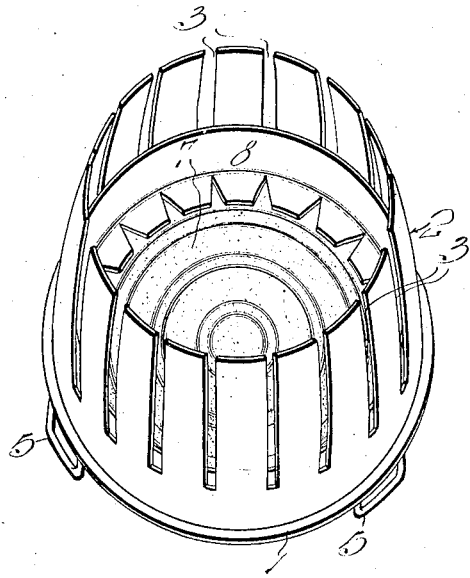
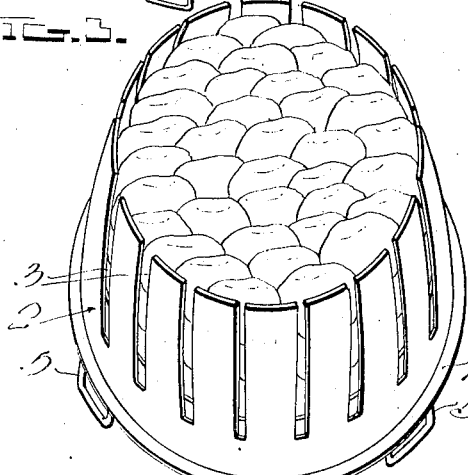
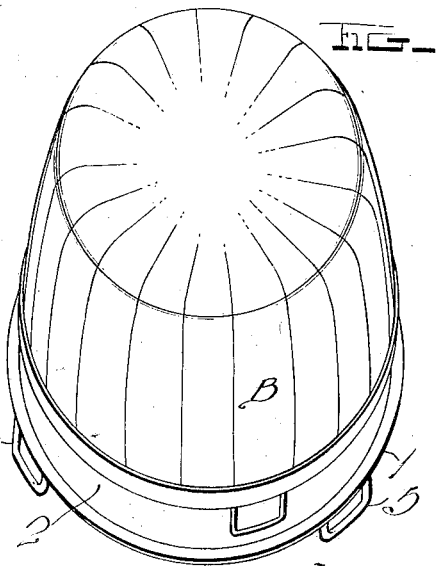
Inventor
G. O. Reshaw Feb. 15, 1927.
G. O. RESHAW
1,617,963
FRUIT PACKING DEVICE
Filed Jan. 29, 1925   2 Sheets-Sheet 2
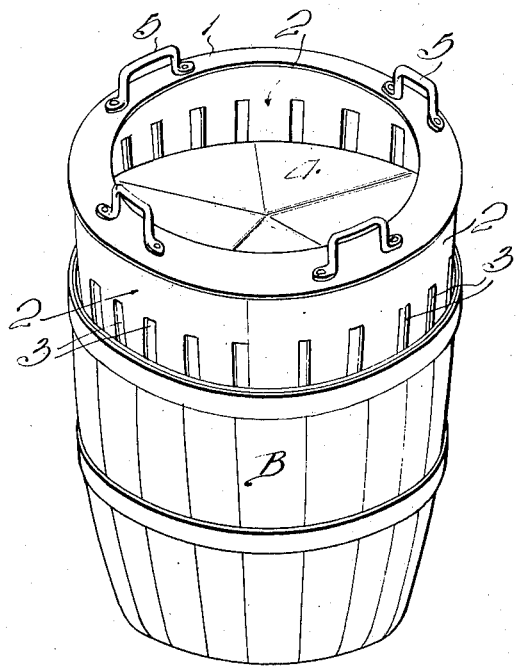
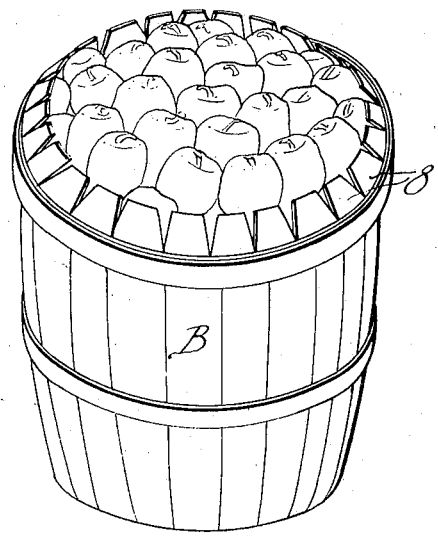
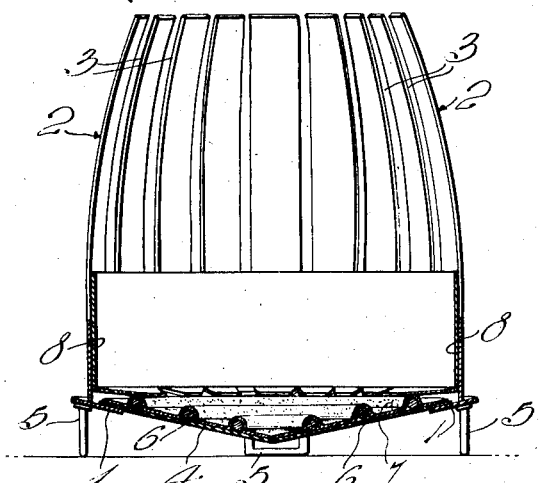
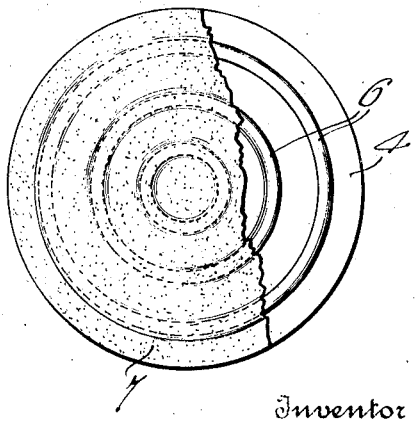
Inventor
G. O. Reshaw
Witness
H. Woodard
By H. B. Wilson &co.
Attorneys Patented Feb. 15, 1927.                                                         1,617,963

UNITED STATES PATENT OFFICE.

GEORGE O. RESHAW, OF CORY, COLORADO.

FRUIT-PACKING DEVICE.

Application filed January 29, 1925. Serial No. 5,550.

My invention is a device for packing certain fruits and vegetables in the usual circular bushel baskets and for giving the top of the pack a "crown" or "bulge" with the pieces in the upper layer arranged in concentric rings, this being commonly known as "ring packing." This style of packing is very desirable since it produces an attractive appearance when the opened basket is placed on display but it has not been extensively used in the past because it was done by hand and required time and skill.

The object of this invention is to provide a simple and practical device by means of which such packing of apples, peaches and other large fruit in circular baskets may be rapidly and effectively performed without the need of skill on the part of the operator.

With the foregoing in view, the invention resides in the novel subject matter hereinafter described and claimed, the description being supplemented by the accompanying drawings.

Figure 1 is a perspective view of the packing receptacle in the position which it assumes when it is being withdrawn from a basket of fruit packed with its aid, the removable bottom of said receptacle being removed in this figure.

Figure 2 is a perspective view of the packing receptacle with its removable bottom in place, the receptacle being shown in position to receive the fruit. This view also illustrates in perspective an ornamental paper liner which is preferably used.

Figure 3 is a perspective view of the packed receptacle and a fruit basket in readiness to be telescoped over the same.

Figure 4 is a perspective view illustrating the manner in which a fruit basket is telescoped or placed over the filled receptacle or packing form.

Figure 5 is a perspective view illustrating the manner in which the wall of the packing receptacle is withdrawn from the fruit basket to leave the fruit in the latter.

Figure 6 is a perspective view of a basket of fruit packed by means of the invention.

Figure 7 is a vertical sectional view of the device in the position disclosed in Fig. 2.

Figure 8 is a top plan view partly broken away, showing the removable bottom for the packing receptacle.

In the drawings above briefly described, the numeral 1 designates an annular invertible frame, to which an annular resilient wall 2 is secured, said wall being split at intervals as indicated at 3, to render it expansible. These slits 3 are closely spaced to provide a larger number of resilient fingers or slats. The slits 3 extend from one end of the wall 2 and terminate short of the other end of said wall, thus leaving a portion of this wall 2 which is inexpansible, such portion being located adjacent the shoulder 1. This construction provides a rigid support against which the fruit may be keyed as hereinafter explained. The wall 2 projects from one side of the frame 1 and is of a size for snug reception in an ordinary fruit bushel basket B, and said frame projects inwardly from the wall to support a bottom disk 4 which is removable and cooperates with the wall 2, in providing a receptacle in which to pack the fruit. To retain this receptacle in position for packing and also to act as means for withdrawing the wall 2 and the frame 1 from a fruit basket, I provide combined handles and legs 5 which are secured to the frame 1 and project therefrom in the opposite direction from said wall 2. Figs. 2 and 7 illustrate the receptacle supported upon the members 5 in readiness to receive the fruit, and Fig. 3 discloses said receptacle in the same position, but completely packed.

On reference to Fig. 7, it will be seen that the parts 5 form in effect extensions of the wall 2 and that the frame 1 forms an inwardly extending annular shoulder within the wall 2 for supporting the removable bottom disk 4 in spaced relation to the bench, table or other supporting surface on which the device rests while the fruit is placed within it. It will be further noted that the wall 2 constitutes a form or pack-former and is shaped to conform to the inner surface of the side wall of the bushel basket. These baskets have their side walls curved inwardly at their lower portions and the spring fingers or slats produced by the slits 3 are correspondingly curved adjacent their free ends. Since the height of the wall 2 is somewhat more than the depth of the basket, it will be seen that the packing form or receptacle will hold a full bushel of fruit so that the basket will be completely filled. The "crown" or "bulge" on the top of the pack is formed by making the top of the disk 4 concaved as explained below.

The bottom disk 4 is preferably of substantially concavo-convex form with its concave side disposed inwardly, and said side is provided with a plurality of concentric ribs which may be formed by rings 6 of rubber or other desired material. A covering 7 of felt or other cushioning material, may be secured to the upper side of the disk 4 and extends over the rings or ribs, so that no injury to the fruit can take place. By constructing the bottom with concentric ribs, "ring packing" of the fruit is greatly facilitated, as will be appreciated by anyone skilled in the art of fruit packing.

It has been found by extensive tests that when a plain concave disk, that is one that does not have the concentric ribs or ridges 6, is used in the form 2, the fruit will not arrange itself in concentric rings or rows when two or three horizontal layers of fruit are placed in the device and the latter is then alternatively shaken back and forth laterally or in a side-wise direction and oscillated in a horizontal plane, whereas when such operation is carried out in the device with concentric ribs or ridges 6 on the bottom disk or ring facer 4, the fruit automatically adjusts itself in the grooves formed by the ridges and then upon filling the form and shaking again the fruit of the first layer is tightened by gravity and the weight of the fruit above, producing a very compact and regular ringed face on the finished pack. Of course, when this automatic ring-facing is performed the fruit in the outer layer will not be arranged with all of the stem ends or the blossom ends in the same direction, and if that is desired, the first layer of fruit must be placed by hand. However, the concentric rings greatly facilitate this hand packing of the facing layer both with respect to the time required and the ease with which it may be done by unskilled workers. There is a further important advantage of this ring-facer or bottom disk 4 in connection with the location of the latter entirely within the packing form or wall 2. Because of this construction, the device, both during the filling and after filling may be vigorously shaken and oscillated to settle the fruit without any possibility of the two parts 2—4 of the device becoming detached or separated and spilling the fruit. The shaking is very important in order to get a pack that will not settle during shipment and thus arrive at its destination in a sunken condition which results in a lower market price and possibly an underweight package. To obtain a tight pack that will not settle during shipment, it is not only necessary to shake the fruit during the filling of the form 2, but, after the basket is applied to the filled form as shown in Fig. 4 and both are then inverted to the position shown in Fig. 5, it is important that the removable bottom or ring-facing disk 4 be held down on the pack during the removal of the form or wall 2. While the latter conforms to the interior of the basket, these baskets vary somewhat in size and shape, and as the form is pulled out from between the pack and the basket, the mass of fruit must necessarily settle into contact with the basket walls. Owing to the ring-facing disk 4 being pressed down during this settling of the fruit in the basket, the ringed top layer will be held intact and the bulged and ringed face of the pack will not be lost. After the removal of the form or wall 2, the disk 4 remains on the pack and to further settle the fruit, the hands are placed on the top of the disk, with the fingers engaging the basket, and the latter is then rocked vertically and horizontally while pressure is put on the disk to hold the ringed face as the fruit settles to its final position from which it cannot shift during transportation. It will be seen on reference to Fig. 7 that the diameter of the disk 4 is greater than the diameter of the small end of the wall 2, formed by the free ends of the spring fingers or slats, and as this wall 2 is withdrawn while the disk 4 is held down, the latter will cause these spring fingers to yield outwardly and slide against the wall of the basket so that the pack is not disturbed and the fruit is not injured. This is important in that it permits the transfer of the pack from the form to the basket with the least possible disturbance of the pack, and permits the form to correspond as nearly as possible to the basket both with respect to shape and capacity or contents. It will also be noted that the disk 4 is of less diameter than the top of the basket and can move down into the latter as the fruit settles, thus retaining the ringed face on the pack.

To use the invention, the loose bottom or ring-facing disk 4 is pushed through the small resilient end of the wall 2 and placed upon the supporting frame or shoulder 1 with its concave side up, the wall and disk thus forming a receptacle which is supported on a flat surface by reason of the combined handle and leg extensions 5 of the wall 2. When it is desired to use an ornamental paper liner 8, it is then placed in position upon the disk 4 and within the wall 2 as shown in Fig. 2. While this liner is not at all essential, it is well worth its small cost since it adds to the attractiveness of the packed basket, protects the outer ring of the face of the pack and may be used to display advertising matter. When it is desired to have the face of the pack with the corresponding portions of each piece of fruit uppermost, the first layer must be placed by hand on the concave face of the disk 4. The fruit to form the face is of uniform size and is properly positioned between the concentric rings 6 and between the outermost one and the wall 2. This portion of the wall 2 being in a fixed position with respect to the disk permits the face to be "keyed" so that all pieces of fruit are firmly held in position. During this operation, the concentric rings greatly aid the positioning and holding of the fruit. The balance of the pack is then quickly placed upon the facing layer from a trough or chute, and during the filling, the device is tilted back and forth laterally and also oscillated to settle the fruit, as previously set forth. A basket is then inverted, placed over the device and pushed down, and both are then turned over placing the basket in upright position on the floor. The operator may then place one foot one the center of the disk 4 and by grasping the handles 5 may pull the form or wall 2 upwardly out of the basket while a light pressure is maintained on the disk or facer. It is better however to first start or loosen the form 2 by a few short jerky movements before pulling it entirely out. After the form is removed, the operator then places his hands on top of the facer or disk 4 with the fingers grasping the rim of the basket, and the latter is then rocked or shaken a few times to thoroughly settle the fruit while the facing layer is held in position. The disk 4 is then removed leaving the packed basket as shown in Fig. 6. When it is desired to automatically ring the facing layer, a quantity of fruit more than sufficient to cover the disk 4 is placed thereon and the entire device is then shaken or rocked vertically and also oscillated horizontally. This operation due to the concentric rings or ridges on the disk 4, causes the first layer of fruit to be regularly arranged in concentric rings. The other operations as above described are then carried out to complete the pack.

It will be seen from the foregoing that while the invention is rather simple and inexpensive, it will be very desirable, rapid and generally efficient. Excellent results have been obtained from the construction shown and it is therefore preferably followed. However, within the scope of the invention as claimed, modifications may of course be made.

I claim:

1. A fruit packing device comprising an invertible annular frame, an annular resilient wall secured to and projecting from one side of said frame for reception in a fruit basket, said wall being split at intervals to render it expansible and said frame projecting inwardly from said wall, combined handles and legs secured to and projecting from the other side of said frame at circumferentially spaced points, and a disk receivable within the aforesaid expansible wall and adapted to rest on the inner projecting portion of the frame to co-act with said wall in forming a packing receptacle when the frame rests on said combined handles and legs, the latter serving to withdraw the frame and wall from a fruit basket after the latter is telescoped over the packed receptacle and said receptacle and basket bodily inverted, the internal diameter of the aforesaid frame being sufficiently great to permit the operator to engage the disk with one foot while withdrawing the wall and frame from the basket.

2. A fruit packer comprising a facing disk, and a packing form having a shoulder upon which the peripheral portion of said facing disk rests removably, said form embodying supporting means projecting below said shoulder and below all parts of said facing disk to rest on a horizontal surface and permit horizontal shaking and lateral tilting of the form to effect settling of the fruit during packing, said form also embodying a fruit-retaining wall projecting above said shoulder and surrounding said facing disk, said form being open at its upper end for reception of the fruit and being adapted when packed for reception in an inverted fruit basket, the lower end of said form being open and of sufficient internal size to permit the operator to insert one foot and hold the facing disk down while upwardly withdrawing the form from the basket by hand, after inverting the packed form with the basket thereon.

3. A ring packer comprising a facing disk having a concave side disposed upwardly and provided with concentric grooves in which to place and key the first layer of fruit, and an upwardly contracted wall surrounding said facing disk and having a shoulder at its lower end upon which the disk rests removably, said wall having an inexpansible portion projecting a short distance above the facing disk to permit keying of the fruit without danger of distorting the wall, the portion of said wall above said inexpansible portion being composed of resilient fingers, said wall when filled with fruit being receivable in an inverted fruit basket, whereupon the wall and facing disk may be inverted with the basket surrounding said wall, the facing disk being then operated to hold the ring facing of the fruit intact while withdrawing the wall from the basket and disk.

4. In a ring packer, a facing disk having a concave side disposed upwardly and formed with concentric ridges to properly position the first layer of fruit, and a rigid fruit-retaining wall extending above said disk and supporting said disk, said wall and disk being bodily movable to permit shaking of the fruit into the spaces between said ridges.

In testimony whereof I have hereunto affixed my signature.

GEORGE O. RESHAW.